Patented Jan. 8, 1946

2,392,663

UNITED STATES PATENT OFFICE 2,392,663

AMINOANTHRAQUINONE DERIVATIVES

Paul Grossmann, Binningen, Switzerland, assignor to Society of Chemical Industry in Basle, Basel, Switzerland, a Swiss firm No Drawing. Application August 24, 1942, Serial No. 455,951. In Switzerland October 15, 1941

8 Claims. (Cl. 260—377)

The present invention is concerned with new aminoanthraquinone derivatives which may be useful for dyeing and printing the most diverse materials or may be used as intermediate products in the manufacture of dyestuffs. More particularly the present invention refers to new acetate rayon dyestuffs of the water-soluble type. Still more particularly the present invention provides new water-soluble acetate rayon dyestuffs yielding strong and/or pure shades of blue to green.

It is well known that certain di- and polyaminoanthraquinones are valuable acetate rayon dyestuffs. Most of these dyestuffs are of the water-insoluble type and are used for dyeing in form of aqueous emulsions or dispersions. Since this dyeing method has certain drawbacks, many attempts have been made to produce water-soluble aminoanthraquinone dyestuffs which possess sufficient affinity for acetate rayon in form of aqueous solutions. Such water-soluble dyestuffs are bound to contain solubilizing groups, such as carboxyl groups, and several proposals are known in the art amounting to the introduction of solubilizing groups into water-insoluble aminoanthraquinone acetate rayon dyestuffs.

Whereas the introduction of sulfonic acid groups generally affects the affinity of the dyestuffs towards acetate rayon most deleteriously, useful acetate rayon dyestuffs have already been obtained by introducing carboxylic acid groups into the molecule of an insoluble dye of the aminoanthraquinone type. Most of these contain a carboxyl group in a rather external linkage, for instance attached to a side chain which is aliphatically bound to an amino group of the aminoanthraquinone derivative.

In contradistinction to this, according to the present invention amino compounds of the anthraquinone series containing at least two primary amino groups at least one of which is directly attached to an anthraquinone nucleus, are reacted with such molecular proportions of dicarboxylic acid anhydrides that at least one amino group is acylated and at least one amino group remains unchanged.

The amino compounds of the anthraquinone series corresponding with the above definition may be aminoanthraquinones containing two, three or even four amino groups directly attached to an anthraquinone nucleus and besides may contain further substituents, such as alkyl, especially methyl groups, halogen, nitro- and hydroxyl groups, etc. With advantage such starting compounds are used that are free from groups of the water-solubilizing type, such as acid groups, for instance carboxylic or sulfonic acid groups. Besides the primary amino group directly attached to the anthraquinone nucleus a further primary amino group may also be present in external linkage, i. e. in a radical which is united to the anthraquinone nucleus by a link which may be an imino group or another inorganic atom or atomic grouping. The said radical may be of aromatic or aliphatic character, such as a phenyl, substituted phenyl, ethyl or propyl radical.

Amongst aminoanthraquinones containing two or more amino groups directly attached to an anthraquinone nucleus 1:4- and 1:5-diaminoanthraquinone, 1:4:5-triaminoanthraquinone and 1:4:5:8- or 1:4:5:6-tetraminoanthraquinone may be particularly mentioned. In these aminoanthraquinones one or more amino groups may be substituted (provided there are at least two primary amino groups left in the molecule). As substituents may be used the most diverse radicals for instance of the aliphatic, aromatic, hydroaromatic and heterocyclic series, such as lower alkyl groups (up to five carbon atoms, especially methyl and ethyl) and aryl radicals (especially phenyl), which as indicated above, may carry further substituents including amino groups. As examples mono-methylated 1-hydroxy-4:5:8-triaminoanthraquinone, monophenylated 1:4:5:8-tetraaminoanthraquinone, 1-amino-4-(para-aminophenyl)-aminoanthraquinone or 1:4:5-triamino-8-(para-aminophenyl)-aminonanthraquinone may be mentioned, further partially alkylated polyaminoanthraquinones, etc.

With advantage such starting compounds are used which are free from aliphatic bound, i. e. alcoholic hydroxyl groups.

The dicarboxylic acid anhydrides used for the present process are derived from dicarboxylic acids capable of forming inner anhydrides, i. e. generally speaking such dicarboxylic acids, the carboxyl groups of which are attached to two carbon atoms directly bound to one another. Such acids are for instance phthalic, succinic, maleic and quinolinic acids, as well as their substitution products.

According to the present invention acylation is to occur in such a manner that at least one amino group is acylated, whereas at least one amino group remains unchanged. Thus, for instance, in a diamino-anthraquinone one amino group is acylated, in a triamino-anthraquinone one or two may be acylated, etc. This result is easily obtained by proper selection of the conditions of reaction such as time, temperature, solvents or diluents, concentration and especially by proper selection of the molecular proportions, for instance by using only the theoretical amount or a slight excess thereover of the acylating agent.

Especially useful results are obtained according to the present invention if aminoanthraquinones containing more than two amino groups (at least two of which are primary) are used as starting materials and acylation is carried out in order to affect only one amino group. The mono-acylation of such products is as a rule easily effected if the anhydrides of dicarboxylic acid are used in substantially molecular proportion, i. e. with only slight excess over the theoretical amount. The whole of the starting material can be transformed into a water-soluble product (which indicates a successful operation) if an excess of about 5 to 20 per cent. of the anhydride is used.

The reaction is preferably carried out in indifferent solvents or diluents, such as tertiary bases, for instance pyridine or dimethylaniline or benzene and its substitution products, for instance dichlorobenzene, nitrobenzene or solvent naphtha. In many instances moderate heating is sufficient, such as heating to 30 to 70°, and only in few instances stronger heating is necessary. Excessive temperatures are of course to be avoided, but even if no strong heating is necessary, temperatures of 100–140° C. may sometimes be used, if desired.

It is very surprising that according to the present invention the reaction occurs in such a manner that only one amongst two or more equivalent amino groups is acylated. The resulting products contain free carboxyl groups and form alkali salts soluble in water. They may be used as intermediates, but chiefly they represent valuable dyestuffs suitable for dyeing and printing cellulose esters and ethers from aqueous solutions according to known processes. They may further be used for the coloration of other materials such as natural fibers of vegetable and animal origin, synthetic fibers from regenerated cellulose or superpolyamides as well as for the coloration of masses.

The following examples illustrate the invention, the parts being by weight:

Example 1

13.4 parts of 1:4:5:8-tetraaminoanthraquinone are dispersed in 50 parts of pyridine. 8 parts of phthalic acid anhydride are added and the whole is heated to 60° C. for ½ to 1 hour. 50 parts of caustic soda of 4 per cent. strength are added and pyridine and water are distilled off in vacuo. There remains a dark dyestuff which dissolves in water with violet-blue color and dyes acetate rayon from a bath containing salt in very strong and pure blue tints of good fastness. It possesses the formula

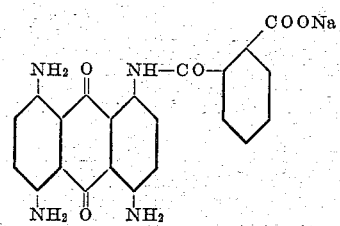

If instead of phthalic anhydride the corresponding quantity of a substituted phthalic anhydride, e. g. chlorophthalic or nitrophthalic anhydride is used, or quinolinic acid anhydride, very similar dyestuffs are obtained.

Example 2

13.4 parts of 1:4:5:8-tetraaminoanthraquinone, 100 parts of dimethylaniline and 5.4 parts of maleic acid anhydride are heated together to 60° C. for ½ to 1 hour. The mixture is then poured into about 300 parts of hydrochloric acid of 11 per cent. strength, the precipitate is filtered off, washed neutral, mixed with the requisite amount of caustic soda solution for obtaining the sodium salt and dried in vacuo. The resulting dyestuff of the probable formula

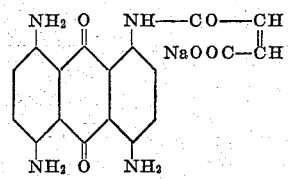

is a dark powder dissolving in water with violet blue color which dyes acetate rayon very pure and strong shades of blue.

A dyestuff dyeing navy blue is obtained if crude technical 1:4:5:6-tetraaminoanthraquinone is used instead of 1:4:5:8-tetraaminoanthraquinone.

A similar dyestuff is also obtained if 1-hydroxy-4:5:8-triaminoanthraquinone is used.

Example 3

4.1 parts of 1-amino-4-(para-aminophenyl)-aminoanthraquinone are heated in 30 parts of nitrobenzene together with 1.35 parts of maleic acid anhydride to 40–50° C. for one hour. Then 30 parts of alcohol are added, the mixture is filtered and the precipitate is washed with alcohol. The dyestuff is mixed with the amount of caustic soda solution necessary for transformation into its sodium salt and evaporated to dryness in vacuo. It is a dark powder of the formula

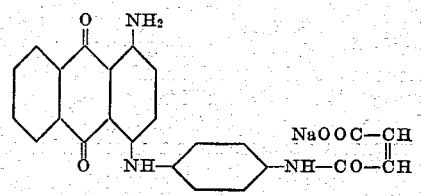

and/or

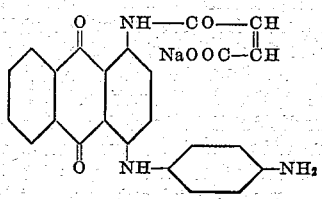

which dissolves in water with blue coloration and dyes acetate rayon very fast blue shades.

On analogous treatment 1:4:5-triamino-8-(para-aminophenyl)-aminoanthraquinone yields a blue-green dyestuff.

Example 4

7.1 parts of 1-hydroxy-4:5-diamino-8-methylamino-anthraquinone are heated to 60° C. for about one hour in 50 parts of dimethylaniline together with 2.7 parts of maleic acid anhydride. The mixture is then poured into 150 parts of hydrochloric acid of 11 per cent. strength and the dyestuff is worked up as described in Example 2. It is a dark powder of the formula

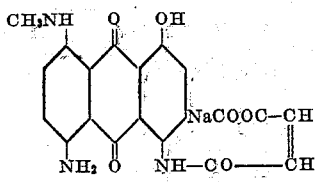

and/or

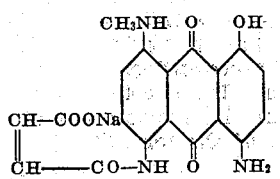

which dissolves in water with blue color and dyes acetate rayon very pure greenish-blue shades, beautiful in artificial light, and of good fastness.

Example 5

9.1 parts of 1-anilido-4:5:8-triaminoanthraquinone, 30 parts of dimethylaniline and 2.7 parts of succinic acid anhydride are heated to 60° C. for 1 to 2 hours. The dyestuff is worked up as described in Example 4. A dark powder is obtained corresponding to the formula

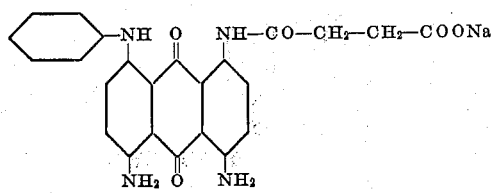

and/or

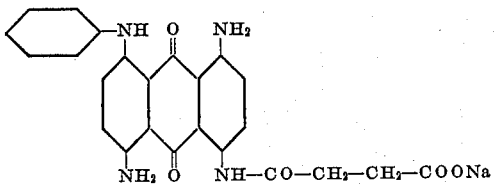

and/or

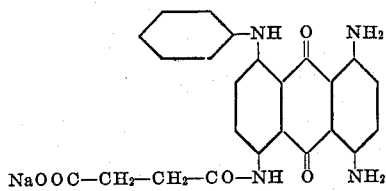

which dyes acetate rayon strong blue-green shades.

If maleic acid anhydride is used instead of succinic acid anhydride a very similar dyestuff is obtained.

Example 6

6 parts of 1:5-diaminoanthraquinone are heated to 75° C. in 100 parts of ortho-dichlorobenzene together with 2.7 parts of maleic acid anhydride until the reaction product is soluble in diluted alkalies. The reaction mixture is cooled down, filtered, and the precipitate is washed with alcohol. Crystals of orange color are obtained, dissolving sparingly in chlorobenzene, but easily soluble in dilute alkalies to red-orange solutions. The product corresponds probably to the formula

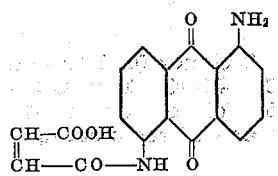

If phthalic acid anhydride is used instead of maleic acid anhydride, heating up to 100° C. is advisable.

Example 7

6 parts of 1:4-diaminoanthraquinone, 50 parts of dimethylaniline and 2.7 parts of maleic acid anhydride are heated to 80–90° C. during one hour. The dyestuff is worked up as indicated in Example 4. It is a blue-red powder of the probable formula

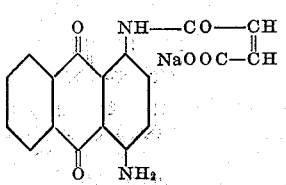

dissolving in water with violet color and dyeing acetate rayon violet shades.

A similar dyestuff is obtained by using the corresponding quantity of phthalic acid anhydride or a substituted phthalic acid anhydride.

Example 8

100 parts of desized and wetted out acetate rayon are entered at 40° C. in a dyebath containing 2 parts of the dyestuff of Example 1, first paragraph, 30 parts of common salt and 5 parts of ammonium oxalate in 4000 parts of water. The temperature is raised to 80° C. within ½ hour and dyeing is continued for a further hour at 80–85° C. The rayon is well rinsed and finished as usual. The acetate rayon is dyed a strong and pure blue.

What I claim is:

1. A water-soluble acetate rayon dyestuff consisting of an alkali metal salt of an aminoanthraquinone containing one anthraquinone nucleus bearing, as substituents directly attached to said nucleus a hydroxyl group, two amino groups, at least one of which is primary, and one grouping of the formula

—NH—CO—X—COOH wherein —CO—X—CO— is the radical of an anhydride-forming dicarboxylic acid, X representing a bridge of at least two carbon atoms.

2. A water-soluble acetate rayon dyestuff consisting of an alkali metal salt of an aminoanthraquinone containing one anthraquinone nucleus bearing, as substituents directly attached to said nucleus, at least two amino groups, at least one of which is primary, and at least one grouping of the formula —NH—CO—X—COOH wherein —CO—X—CO— is the radical of an anhydride-forming dicarboxylic acid, X representing a bridge of at least two carbon atoms.

3. A water-soluble acetate rayon dyestuff consisting of an alkali metal salt of an aminoanthraquinone of the formula

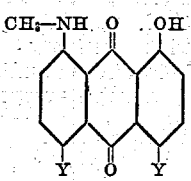

wherein one Y stands for NH₂ and the other Y for —NH—CO—X—COOH, —CO—X—CO— being the radical of an anhydride-forming dicarboxylic acid and X representing a two-carbon bridge.

4. A water-soluble acetate rayon dyestuff consisting of an alkali metal salt of an aminoanthraquinone of the formula

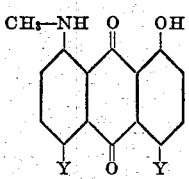

wherein one Y stands for NH₂ and the other Y stands for

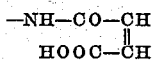

5. A water-soluble acetate rayon dyestuff consisting of an alkali metal salt of an aminoanthraquinone containing one anthraquinone nucleus bearing, as substituents directly attached to said nucleus, three amino groups, at least two of which are primary, and one grouping of the formula —NH—CO—X—COOH wherein

is the radical of an anhydride-forming dicarboxylic acid, X representing a bridge of at least two carbon atoms.

6. A water-soluble acetate rayon dyestuff consisting of an alkali metal salt of an aminoanthraquinone of the formula

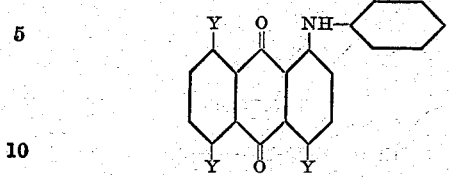

wherein two Y's stand for primary amino groups and one Y stands for a grouping of the formula —NH—CO—X—COOH, —CO—X—CO— being the radical of an anhydride-forming dicarboxylic acid and X representing a two-carbon bridge.

7. A water-soluble acetate rayon dyestuff consisting of an alkali metal salt of an aminoanthraquinone of the formula

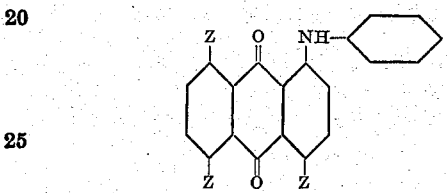

wherein two Z's stand for primary amino groups and one Z stands for a grouping of the formula —NH—CO—CH₂—CH₂—COOH.

8. An alkali metal salt of the aminoanthraqiunone derivative of the formula

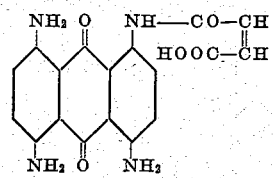

PAUL GROSSMANN.